United States Patent
Li et al.

(10) Patent No.: US 9,245,144 B2
(45) Date of Patent: Jan. 26, 2016

(54) SECURE DATA CONTAINER FOR WEB APPLICATIONS

(71) Applicant: Intel Corporation, Santa Clara, CA (US)

(72) Inventors: Hong Li, El Dorado Hills, CA (US); Rita H. Wouhaybi, Portland, OR (US); Tobias M. Kohlenberg, Portland, OR (US); Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 13/628,502

(22) Filed: Sep. 27, 2012

(65) Prior Publication Data

US 2014/0090009 A1    Mar. 27, 2014

(51) Int. Cl.
| | |
|---|---|
| *G06F 21/00* | (2013.01) |
| *G06F 21/62* | (2013.01) |
| *G06F 21/50* | (2013.01) |
| *H04L 29/06* | (2006.01) |

(52) U.S. Cl.
CPC .......... *G06F 21/6218* (2013.01); *G06F 21/50* (2013.01); *G06F 21/62* (2013.01); *H04L 63/102* (2013.01)

(58) Field of Classification Search
CPC ....... G06F 21/50; G06F 21/56; G06F 21/566; G06F 21/567; G06F 21/62
USPC .................... 726/1, 22, 26, 29, 27
See application file for complete search history.

(56) References Cited

U.S. PATENT DOCUMENTS

| | | |
|---|---|---|
| 2005/0010765 A1 | 1/2005 | Swander et al. |
| 2006/0253581 A1* | 11/2006 | Dixon et al. ............... 709/225 |
| 2007/0199060 A1* | 8/2007 | Touboul ..................... 726/11 |
| 2011/0138174 A1* | 6/2011 | Aciicmez et al. ........... 713/165 |
| 2012/0011559 A1 | 1/2012 | Miettinen et al. |
| 2012/0096511 A1 | 4/2012 | Plummer |

FOREIGN PATENT DOCUMENTS

KR    1020100021077 A    2/2010

OTHER PUBLICATIONS

International Search Report and Written Opinion dated Dec. 27, 2013 from International Patent Application No. PCT/US2013/059446.
Sandbox (Computer Security), Obtained on Sep. 24, 2012, from http://en.wikipedia.org/w/index.php?title=Sandbox_(computer_security)&oldid=510957972, 2 Pages.

* cited by examiner

*Primary Examiner* — Edward Zee
(74) *Attorney, Agent, or Firm* — Jordan IP Law, LLC

(57) ABSTRACT

Systems and methods may provide for identifying web content and detecting an attempt by the web content to access a local data store. Additionally, a determination may be made as to whether to permit the attempt based on a context-based security policy. In one example, the context-based security policy is obtained from one or more of a user profile, a multi-user data source and a cloud service.

12 Claims, 3 Drawing Sheets

SECURE DATA CONTAINER FOR WEB APPLICATIONS

BACKGROUND

Embodiments generally relate to web based security management. More particularly, embodiments relate to the use of secure data containers for web applications.

Emerging markup languages such as HTML5 (Hypertext Markup Language 5, e.g., HTML5 Editor's Draft 8 May 2012, W3C), LLVM (e.g., LLVM 3.1, May 22, 2012, llvm.org), and other runtime or just in time (JIT) environment languages may support more robust multimedia related web platform development. The use of these advanced languages, however, may also expose end user platform components such as local graphics processors, memory, sensors, and so forth, to web applications, wherein the exposure of such components may lead to security concerns.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
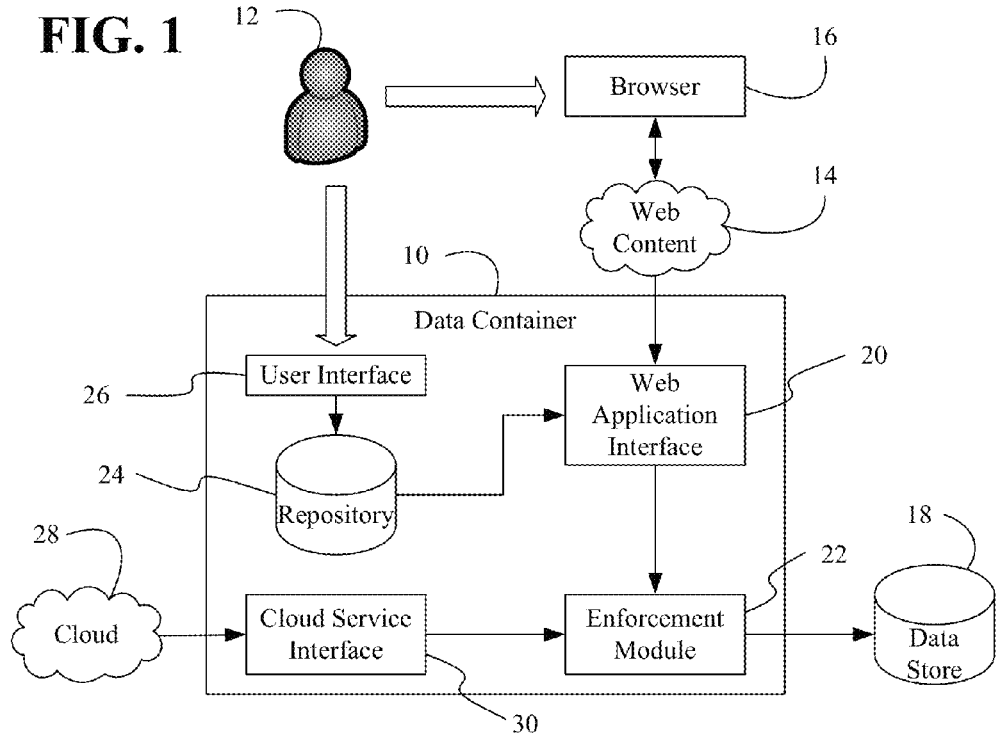
FIG. 1 is a block diagram of an example of a data container according to an embodiment.

Turning now to FIG. 1, a data container 10 is shown in which a user 12 may obtain web content 14 (e.g., web pages, applications, multimedia, etc.) via a browser 16. The browser 16 may execute on a platform such as, for example, a desktop computer, workstation, notebook computer, smart tablet, smart phone, personal digital assistant (PDA), media player, imaging device, etc., or any combination thereof, wherein the data container 10 may be independent of the type of browser in use. In the illustrated example, the browser 16 is associated with a local data store 18 on the platform. Of particular note is that the web content 14 may have access to the local data store 18 by virtue of the web content being written in a runtime and/or JIT environment language such as HTML5, which exposes platform hardware. Accordingly, the illustrated data container 10 includes a web application interface 20 that may be configured to detect attempts by the web content 14 to access (e.g., read from and/or write to) the local data store 18. Additionally, an enforcement module 22 may determine whether to permit the access attempts based on a context-based security policy. The context-based security policy may be obtained from, for example, a user profile stored in a policy repository 24 that is configurable by the user 12 and/or administrator via a user interface 26. The context-based security policy may also be obtained from a multi-user (e.g., community) data source or other cloud service 28 via a cloud service interface 30.

Generally, the context-based security policy may enable the enforcement module 22 to prevent unintended accesses, malicious actions and/or attacks. More particularly, the context-based security policy may identify attributes such as types of content, content sources, browsing sequences, etc., as well as access controls for those attributes. For example, the user 12 may establish a policy that permits attempts by a particular type of JavaScript (JS) application to access the local data store 18, and denies attempts by another type of web application to access the local data store 18. Additionally, the user 12 may establish a policy in which web content from a particular site is denied access to the local data store 18, or in which access attempts by a certain web application are to be granted only if the user 12 visits a particular sequence of web pages (e.g., online purchasing sequence) prior to the attempt.

As will be discussed in greater detail, the enforcement module 22 may either take automatic action (e.g., automatic denial or grant of the attempt) or prompt the user 12 for authorization to act. Indeed, the user prompt may include valuable contextual information. For example, a multi-user data source on the cloud service 28 may enable crowd sourcing of decisions made by a large number of users. More particularly, community (e.g., multi-user) statistics obtained from the multi-user data source may indicate, for example, that 79% of users have chosen to deny access to their respective local data stores while 21% of users have allowed access when encountering a particular web application. In such a case, the user 12 may be informed of the community trend and determine whether to grant access to the local data store 18 accordingly. Moreover, the access decisions managed by the enforcement module 22 may be sent back to the multi-user data source to further supplement the community statistics. The data container 10 may be implemented on the host platform in the form of a local operating system (OS)/browser independent application, a browser plug-in, firmware, and so forth.

Figure 2:
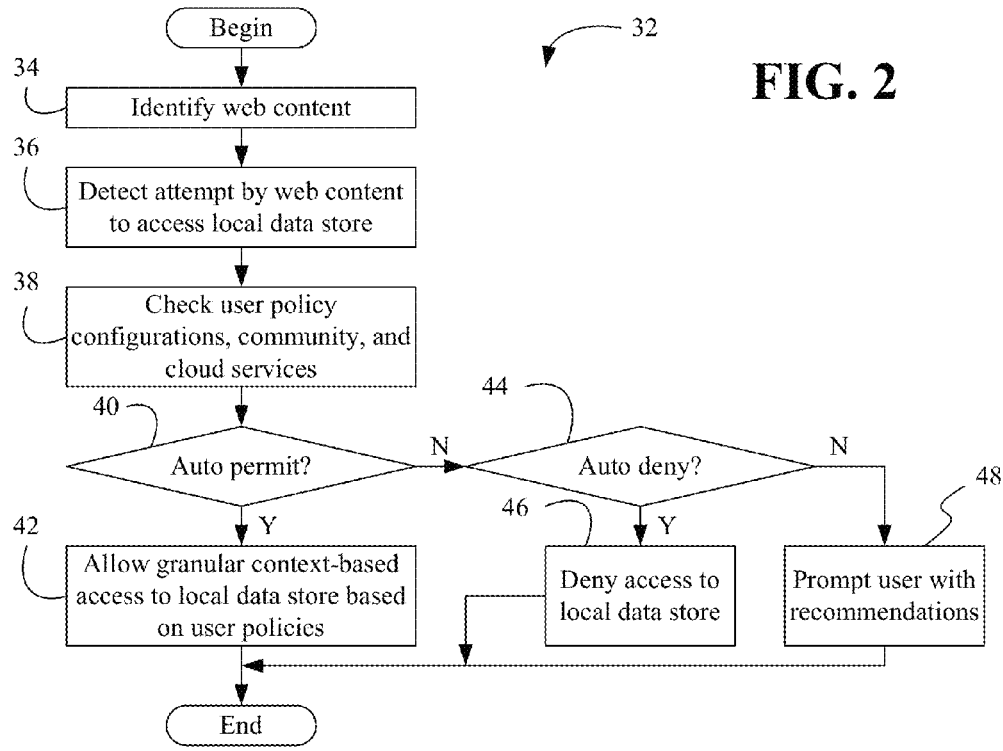
FIG. 2 is a flowchart of an example of a method of enforcing security policies in a web based environment according to an embodiment.

Turning now to FIG. 2, a method 32 of enforcing security policies in a web based environment is shown. The method 32 may be implemented as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 32 may be written in any combination of one or more programming languages, including an object oriented programming language such as C++ or the like and conventional procedural programming languages, such as the "C" programming language or similar programming languages. Moreover, the method 32 may be implemented as the data container 10 (FIG. 1) using any of the aforementioned circuit technologies.

Illustrated processing block 34 provides for identifying web content, wherein an attempt by the web content to access a local data store may be detected at block 36. In one example, the web content is written in a runtime and/or JIT environment language such as HTML5, which exposes platform hardware. Block 38 may involve checking various user policy configurations, community data sources, cloud services, and so forth, to determine whether a context-based security policy exists for the access attempt in question. If it can be determined from the context-based security policy at block 40 that the access attempt is permissible, illustrated block 42 allows the access attempt. For example, it might be determined that the user has recently completed a particular browsing sequence that has been stipulated by the context-based security policy as rendering the access attempt trustworthy. The access may therefore be considered "granular" in that it might leverage information about the particular web browsing context in order to make detailed decisions in a user based security architecture.

If, on the other hand, the access attempt is not automatically permissible, block 44 may determine whether the access attempt is to be automatically denied. If so, illustrated block 46 may deny access to the local data store. Otherwise, the user may be prompted at block 48 with one or more recommendations. For example, block 48 may involve generating a first user prompt for authorization to implement an action (e.g., grant, denial) associated with the context-based security policy, wherein the first user prompt may include one or more multi-user statistics. For example, the first user prompt may indicate that a certain percentage of users have denied local storage access when encountering the current web content and recommend that the user also deny access. Moreover, block 48 may involve receiving a response to the first user prompt as well as generating a second user prompt for a reason associated with the first user response (e.g., if the user does not follow the recommendation). Additionally, a response to the second user prompt may be received, wherein the responses to the first and second user prompts may be transmitted to a multi-user data source.

Figure 3:
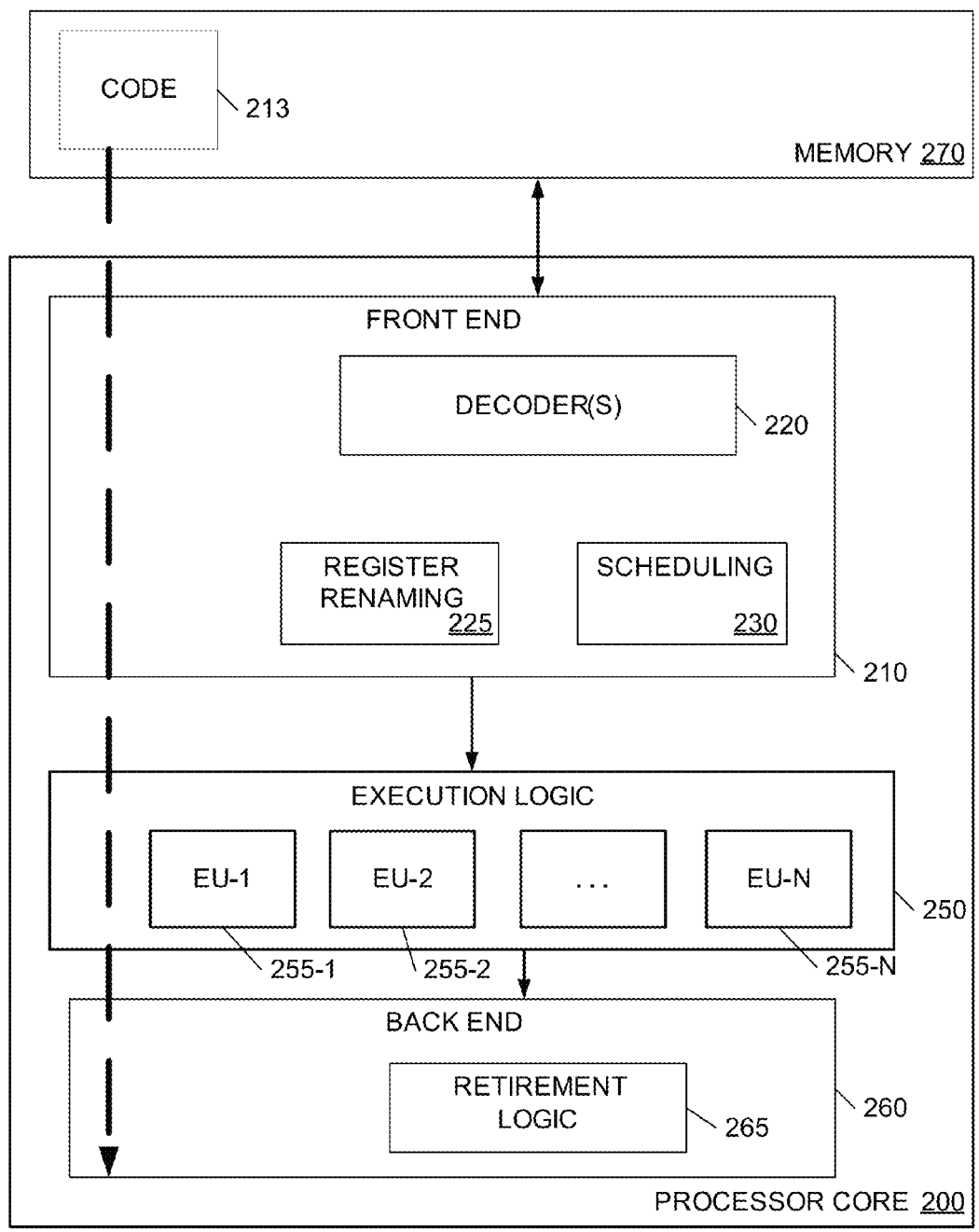
FIG. 3 is a block diagram of an example of a processor according to an embodiment.

FIG. 3 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 3, a processing element may alternatively include more than one of the processor core 200 illustrated in FIG. 3. The processor core 200 may be a single-threaded core or, for at least one embodiment, the processor core 200 may be multithreaded in that it may include more than one hardware thread context (or "logical processor") per core.

FIG. 3 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the data container 10 (FIG. 1), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 3, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 4:
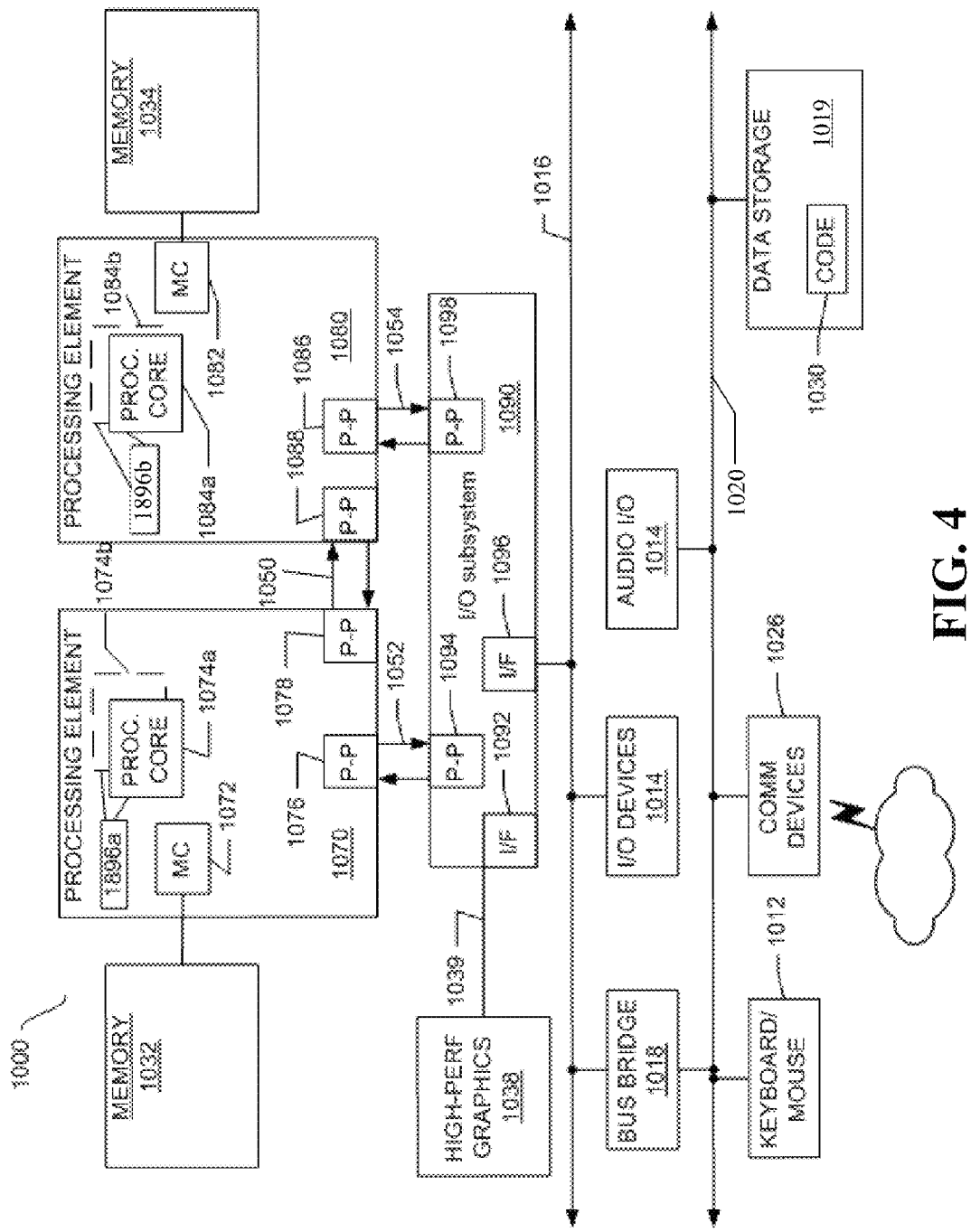
FIG. 4 is a block diagram of an example of a system according to an embodiment.

Referring now to FIG. 4, shown is a block diagram of a system 1000 in accordance with an embodiment of the present invention. Shown in FIG. 4 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 4 may be implemented as a multi-drop bus rather than point-to-point interconnect.

As shown in FIG. 4, each of processing elements 1070 and 1080 may be multicore processors, including first and second processor cores (i.e., processor cores 1074*a* and 1074*b* and processor cores 1084*a* and 1084*b*). Such cores 1074, 1074*b*, 1084*a*, 1084*b* may be configured to execute instruction code in a manner similar to that discussed above in connection with FIG. 3.

Each processing element 1070, 1080 may include at least one shared cache 1896. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 4, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 4, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 4, various I/O devices 1014 may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. In one example, web content is received via the communication devices 1026. The code 1030 may include instructions for performing embodiments of one or more of the methods described above. Thus, the illustrated code 1030 may implement the security module 11 (FIG. 1) and may be similar to the code 213 (FIG. 3), already discussed. Further, an audio I/O 1024 may be coupled to second bus 1020.

Note that other embodiments are contemplated. For example, instead of the point-to-point architecture of FIG. 4, a system may implement a multi-drop bus or another such communication topology. Also, the elements of FIG. 4 may alternatively be partitioned using more or fewer integrated chips than shown in FIG. 4.

Additional Notes and Examples:

Example one may include a web based security system having a local data store and a web application interface to identify web content and detect an attempt by the web content to access the local data store. The system may also have an enforcement module to determine whether to permit the attempt based on a context-based security policy.

Additionally, the enforcement module of the example one system may obtain the context-based security policy from one or more of a user profile, a multi-user data source and a cloud service.

Additionally, the context-based security policy of the example one system may identify one or more of a type of content, a content source and a browsing sequence.

Moreover, any of the aforementioned example one systems may further include a user interface to generate a first user prompt for authorization to implement an action associated with the context-based security policy. Further, the first user prompt of the system may optionally include one or more multi-user statistics. In addition, the user interface of the system may optionally receive a first user response to the first user prompt and generate a second user prompt for a reason associated with the first user prompt.

Moreover, the user interface of the example one system may receive a second user response to the second user prompt and transmit the first user response and the second user response to a multi-user data source.

Example two may also include a web based security apparatus having a web application interface to identify web content and detect an attempt by the web content to access a local data store. The apparatus may also have an enforcement module to determine whether to permit the attempt based on a context-based security policy.

Additionally, the enforcement module of the example two apparatus may obtain the context-based security policy from one or more of a user profile, a multi-user data source and a cloud service.

Additionally, the context-based security policy of the example two apparatus may identify one or more of a type of content, a content source and a browsing sequence.

In addition, the apparatus may include the local data store.

Moreover, any of the aforementioned example two apparatuses may further include a user interface to generate a first user prompt for authorization to implement an action associated with the context-based security policy.

In addition, the first user prompt of the example two apparatus may include one or more multi-user statistics.

In addition, the user interface of the example two apparatus may receive a first user response to the first user prompt and generate a second user prompt for a reason associated with the first user prompt.

Moreover, the user interface of the example two apparatus may receive a second user response to the second user prompt and transmit the first user response and the second user response to a multi-user data source.

Examples may also include a web based security method in which web content is identified, and an attempt by the web content to access a local data store is detected. The method may also involve determining whether to permit the attempt based on a context-based security policy.

Additionally, the method may further include obtaining the context-based security policy from one or more of a user profile, a multi-user data source and a cloud service.

Additionally, the context-based security policy of the method may identify one or more of a type of content, a content source and a browsing sequence.

Moreover, any of the aforementioned method examples may further include generating a first user prompt for authorization to implement an action associated with the context-based security policy.

In addition, the first user prompt of the method may include one or more multi-user statistics.

In addition, the method may further include receiving a first user response to the first user prompt, and generating a second user prompt for a reason associated with the first user response.

Moreover, the method may further include receiving a second user response to the second user prompt, and transmitting the first user response and the second user response to a multi-user data source.

Examples may also include at least one computer readable storage medium having a set of instructions which, when executed by a processor, cause a computing device to perform any of the aforementioned method examples.

Examples may also include a web based security apparatus having means for identifying web content, means for detecting an attempt by the web content to access a local data store, and means for determining whether to permit the attempt based on a context-based security policy.

Additionally, the apparatus may include means for obtaining the context-based security policy from one or more of a user profile, a multi-user data source and a cloud service.

Additionally, the context-based security policy of the apparatus may identify one or more of a type of content, a content source and a browsing sequence.

Moreover, the apparatus may further include means for generating a first user prompt for authorization to implement an action associated with the context-based security policy.

In addition, the first user prompt of the apparatus may include one or more multi-user statistics.

In addition, the apparatus may further include means for receiving a first user response to the first user prompt, and means for generating a second user prompt for a reason associated with the first user response.

Moreover, the apparatus may further include means for receiving a second user response to the second user prompt, and means for transmitting the first user response and the second user response to a multi-user data source.

Technologies described herein may therefore provide a user interface that enables users and/or enterprises to set granular policies in order to prevent unintended or malicious remote manipulations of local data storage. An enforcement module may aggregate a wide variety of context data and take the necessary actions based on user settings. Additionally, the implementation of data container modules in the form of local OS/browser independent applications, browser plug-ins, firmware, etc., may enable the data container to be more flexible, reusable and easily standardized. Indeed, the data container may be bound by policy to any browser on a platform, which may provide seamless protection to the user in the event that a different browser is installed on the platform. In addition, a cloud service interface may enable the collection of statistics regarding remote web applications and other user actions, wherein those statistics may facilitate more intelligent security actions.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
    an operating system-independent and browser-independent data container including a web application interface that obtains web content and detects an attempt by the web content to access a local data store due to at least a portion of the web content being written in one or more of a runtime or a just in time (JIT) environment language;
    an enforcement module in the data container to determine whether to permit the attempt based on a context-based security policy for the identified web content wherein the enforcement module is to obtain the context-based security policy from one or more of a user profile, a multi-user data source and a cloud service and wherein the context-based security policy is to identify one or more of a type of content, a content source and a browsing sequence; and
    a user interface in the data container to generate a first user prompt for authorization to implement an action associated with the context-based security policy, wherein the first user prompt is to include one or more multi-user statistics.

2. The apparatus of claim 1, wherein the user interface is to receive a first user response to the first user prompt and generate a second user prompt for a reason associated with the first user prompt.

3. The apparatus of claim 2, wherein the user interface is to receive a second user response to the second user prompt and transmit the first user response and the second user response to a multi-user data source.

4. The apparatus of claim 1, further including the local data store positioned outside the data container.

5. At least one non-transitory computer readable storage medium comprising a set of instructions which, if executed by a processor, cause a computing device to:
    use an operating system-independent and browser-independent data container including a web application interface to identify web content;
    detect an attempt by the web content to access a local data store positioned outside the data container;
    determine whether to permit the attempt by the web content based on a context-based security policy in an enforcement module in the data container, the context-based security policy being obtainable from one or more of a user profile, a multi-user data source and a cloud service and wherein the context-based security policy is to identify one or more of a type of content, a content source and a browsing sequence; and
    generate a first user prompt for authorization to implement an action associated with the context-based security policy, wherein the first user prompt is to include one or more multi-user statistics.

6. The at least one medium of claim 5, wherein the instructions, if executed, cause a computing device to:
    receive a first user response to the first user prompt; and
    generate a second user prompt for a reason associated with the first user response.

7. The at least one medium of claim 6, wherein the instructions, if executed, cause a computing device to:
    receive a second user response to the second user prompt; and
    transmit the first user response and the second user response to a multi-user data source.

8. A method comprising:
    using an operating system-independent and browser-independent data container including a web application interface to identify web content;
    detecting an attempt by the web content to access a local data store positioned outside the data container; and
    determining whether to permit the attempt by the web content based on a context-based security policy in an enforcement module in the data container; and
    generating a first user prompt for authorization to implement an action associated with the context-based security policy, wherein the first user prompt includes one or more multi-user statistics.

9. The method of claim 8, further including obtaining the context-based security policy from one or more of a user profile, a multi-user data source and a cloud service.

10. The method of claim 9, wherein the context-based security policy identifies one or more of a type of content, a content source and a browsing sequence.

11. The method of claim 8, further including:
- receiving a first user response to the first user prompt; and
- generating a second user prompt for a reason associated with the first user response.

12. The method of claim 11, further including:
- receiving a second user response to the second user prompt; and
- transmitting the first user response and the second user response to a multi-user data source.

* * * * *